Oct. 11, 1938.  A. KOMOW  2,133,101
CLOTH CUTTING MACHINE
Filed Feb. 28, 1936
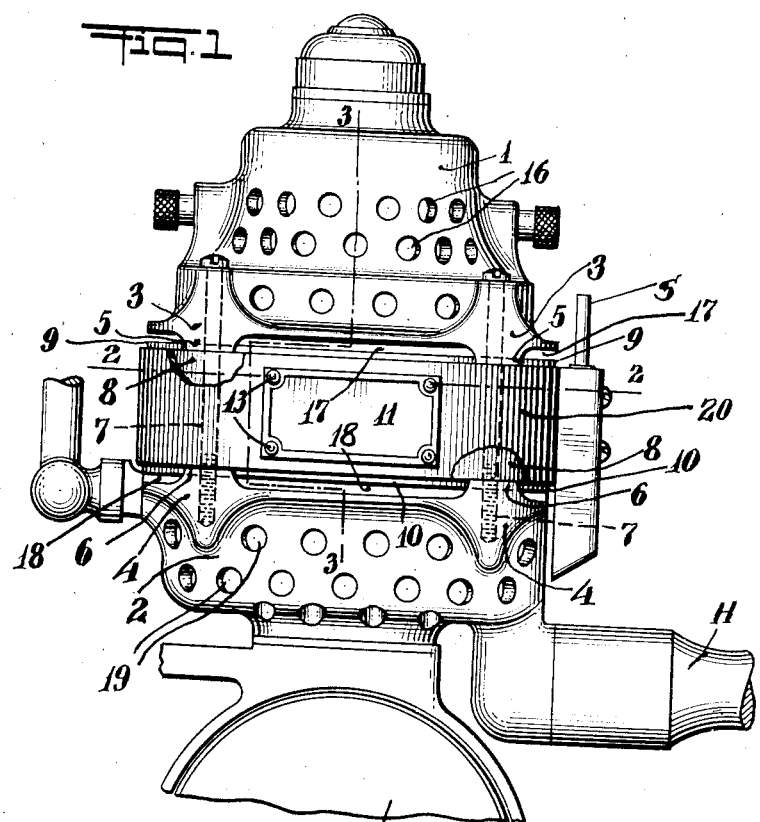
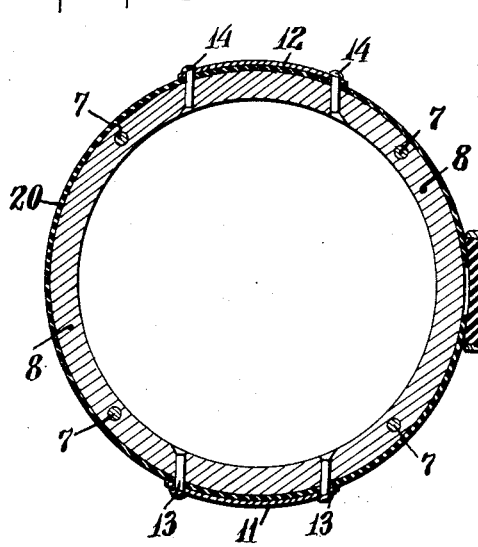
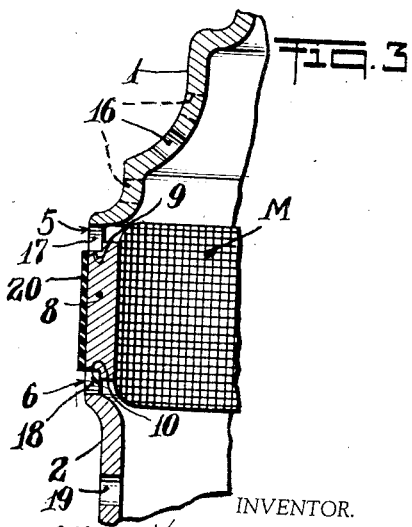
INVENTOR.
Albert Komow
BY
Mock & Blum
ATTORNEYS Patented Oct. 11, 1938

2,133,101

UNITED STATES PATENT OFFICE 2,133,101

CLOTH-CUTTING MACHINE

Albert Komow, New York, N. Y., assignor to U. S. Cloth Cutting Machine Co. Inc., New York, N. Y., a corporation of New York Application February 28, 1936, Serial No. 66,205

1 Claim. (Cl. 172—36)

My invention relates to a new and improved cloth-cutting machine.

One of the objects of my invention is to provide an improved cloth-cutting machine of the type which is operated by means of an electric motor and which is manipulated by hand.

Another object of my invention is to provide an improved cloth cutting machine of this type, which has improved heat insulation for preventing excessive heating of the casing of the motor, or the handle thereof.

Another object of my invention is to provide a cloth-cutting machine which is provided with suitable insulation for protecting the operator and the material from the heat which is generated by the use of the electric motor.

Other objects of my invention will be set forth in the following description and drawing which illustrate a preferred embodiment thereof, it being understood that the above statement of the objects of my invention is intended generally to explain the same without limiting it in any manner.

Fig. 1 is a side elevation showing the improved device.

Fig. 2 is a sectional view on the line 2—2 of Fig. 1, the motor and other interior parts being omitted.

Fig. 3 is a sectional view on the line 3—3 of Fig. 1.

The machine is provided with a casing having an upper metal part 1 and a lower metal part 2. Said parts 1 and 2 may be made from castings, or in any other suitable manner.

The upper casing member 1 is provided with ventilating openings 16 and the bottom casing member 2 is provided with ventilating openings 19. The casing comprises an intermediate ring 8, made of any suitable metal.

As shown in Fig. 3, this intermediate metal ring 8 is recessed so as to provide circumferentially spaced top shoulders 9 and circumferentially spaced bottom shoulders 10. The upper casing member 1 is provided with a plurality of enlarged lugs 3, and the bottom casing member 2 is provided with corresponding enlarged lugs 4. Bolts 7 pass through suitable openings in the lugs 3 and said bolts 7 extend through the intermediate metal ring 8, as shown in Fig. 2.

The bottom end portions of the shanks of said bolts 7 are threaded, as shown in Fig. 1, and the lugs 4 are provided with internally threaded openings or recesses which are engaged by the threaded end portions of the bolts 7.

In order to provide additional ventilation, the upper casing member 1 is provided with a plurality of recesses 17, and the bottom casing member 2 is provided with corresponding recesses 18. The upper casing member 1 can be provided with four recesses or cut-outs 17, which are symmetrically disposed. The bottom casing member 2 may be provided with an equal number of recesses or cut-outs 18.

The lugs 3 are provided with projections 5 which abut the corresponding shoulders 9 of the metal ring 8.

The lugs 4 are provided with corresponding projections 6, which abut the shoulders 10 of the ring 9. These projections and shoulders prevent any turning of the casing members 1 and 2, relative to the intermediate casing member 8. The shoulders 9 and 10 have vertical walls so as to form recesses, in which the projections 5 and 6 fit snugly. For convenience, the device is described with reference to the position shown in Fig. 1. The respective shoulders 9 and 10 are arranged in vertically aligned pairs and the recesses 17 and 18 which are located between said shoulders, are also arranged in vertically aligned pairs.

The intermediate casing member 8 is provided with an outer ring 20 which is made of suitable heat-insulating material. This shell or layer of heat-insulating material 20 is held to the intermediate member 8, by means of clamping members 11 and 12, which are connected to the member 8 by means of fastening members 13 and 14. These fastening members may be of the rivet type. Said plates 11 and 12 may bear suitable indicia, such as the name of the manufacturer and the like.

The electric motor M may be of any suitable type, and its shaft operates a circular knife K or any other type of knife. The bottom casing member 2 is provided with a handle H which may be integral with said bottom casing member 2, or which may be suitably connected thereto. The casing is also provided with a suitable switch S, for opening and closing the circuit of the motor.

When the motor M is operated so as to actuate the knife K (which may be a reciprocating knife or a revolving knife), the heat of the motor is dissipated through the ventilating openings 16, 17, 18 and 19.

The ring of heat-insulation material 20 is directly adjacent the motor M, and it corresponds in shape and in location, substantially to the lateral face of the coils of the motor M. Likewise the metal ring 8 is in efficient heat-conducting contact with the members 1 and 2 by means of the projections 5 and 6. Hence, direct lateral radiation of heat from the motor M is substantially prevented by the heat-insulating member 20 and the internal heat is rapidly dissipated above and below the motor. Each of the recesses 17 and 18 occupies almost one-fourth of the entire circumference of the casing, since the projections 5 and 6 can be made relatively small in circumferential extent. The casing is preferably substantially or wholly imperforate at the lateral face of the motor save for said recesses 17 and 18. As shown in Fig. 3, the ventilating recesses 17 are laterally aligned with the top edge portion and the bottom edge portion of the motor. The height of the insulating member 20 is preferably equal in height to the lateral face of the electric motor M, but I do not wish to be limited to this precise proportion.

I have shown a preferred embodiment of my invention but it is clear that numerous changes and omissions can be made without departing from its spirit.

I claim:

A portable and hand-manipulated cloth-cutting machine comprising a casing, an electric motor located within said casing, said casing comprising an upper casing member and a lower casing member and an intermediate casing member, said electric motor being located adjacent said intermediate casing member, said upper casing member and said lower casing member having ventilating openings, said intermediate casing member having a plurality of vertical recesses at the top face and at the bottom face of said intermediate casing member, said upper casing member and said lower casing member having projections which are located in said recesses, fastening members which connect said upper casing member and said lower casing member to said intermediate casing member, said fastening members passing through said projections of the upper casing member and of the lower casing member, a member made of insulating material and connected to a vertical face of said intermediate casing member, the upper casing member and the lower casing member being provided with recesses which are located between said projections and which are directly adjacent said intermediate casing member, so that additional ventilating openings are provided between said intermediate casing member and said upper casing member and said lower casing member, said intermediate casing member having an external heat-insulating member connected thereto, the lower casing member having a handle connected thereto.

ALBERT KOMOW.